United States Patent
Vanska et al.

(10) Patent No.: US 7,720,446 B2
(45) Date of Patent: May 18, 2010

(54) MULTI-POSITION DEVICE

(75) Inventors: Anssi Vanska, Helsinki (FI); Esa-Sakari Maatta, Helsinki (FI)

(73) Assignee: Nokia Corporation, Espoo (FI)

( * ) Notice: Subject to any disclaimer, the term of this patent is extended or adjusted under 35 U.S.C. 154(b) by 744 days.

(21) Appl. No.: 11/436,044

(22) Filed: May 16, 2006

(65) Prior Publication Data

US 2007/0270107 A1    Nov. 22, 2007

(51) Int. Cl.
    *H04B 1/38* (2006.01)
(52) U.S. Cl. ............... 455/90.3; 455/575.1; 455/575.4; 455/566
(58) Field of Classification Search .............. 455/550.1, 455/566, 575.1, 90.3, 575.4, 556.2
    See application file for complete search history.

(56) References Cited

U.S. PATENT DOCUMENTS

2003/0132863 A1 * 7/2003 Lahr .......................... 341/22
2005/0245251 A1 * 11/2005 Lee et al. .................. 455/422.1
2006/0146014 A1 * 7/2006 Lehtonen .................... 345/156
2007/0082718 A1 * 4/2007 Yoon et al. ............... 455/575.4
2007/0123318 A1 * 5/2007 Joo .......................... 455/575.1

FOREIGN PATENT DOCUMENTS

| EP | 1592209 | 11/2005 |
|----|---------|---------|
| EP | 1710985 | 10/2006 |
| WO | WO 03/050665 | 6/2003 |
| WO | WO 2005/071928 | 8/2005 |
| WO | WO 2006/038499 | 4/2006 |
| WO | WO 2006/072657 | 7/2006 |
| WO | WO 2007/024395 | 3/2007 |

* cited by examiner

*Primary Examiner*—John Lee

(57) ABSTRACT

A multi-position device has first and second body elements configured for sliding engagement and constrained movement with respect to one another along a common plane in X, Y and XY coordinate directions for positioning the body elements in multiple different fixed positions relative to one another and for accessing one or more user interfaces carried on an outward facing surface of one body element covered by the other body element. The body elements are arranged to move relative to another from an overlapping alignment along linear, L-shaped and triangular paths in X, Y and XY coordinate directions back to the original overlapping alignment.

17 Claims, 14 Drawing Sheets

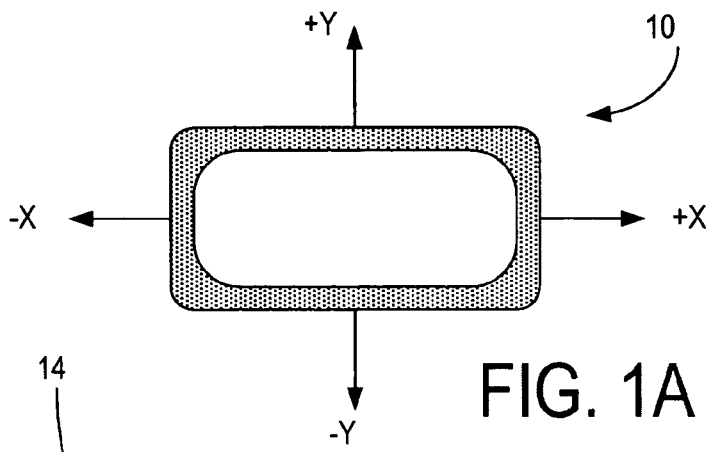
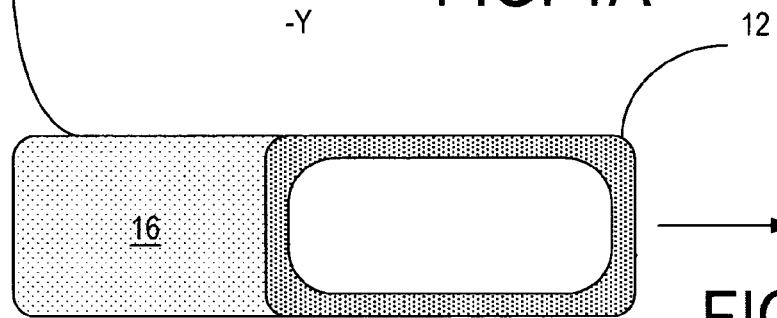
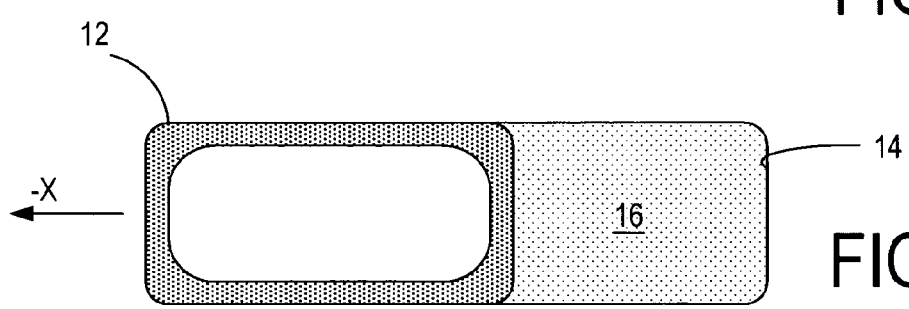
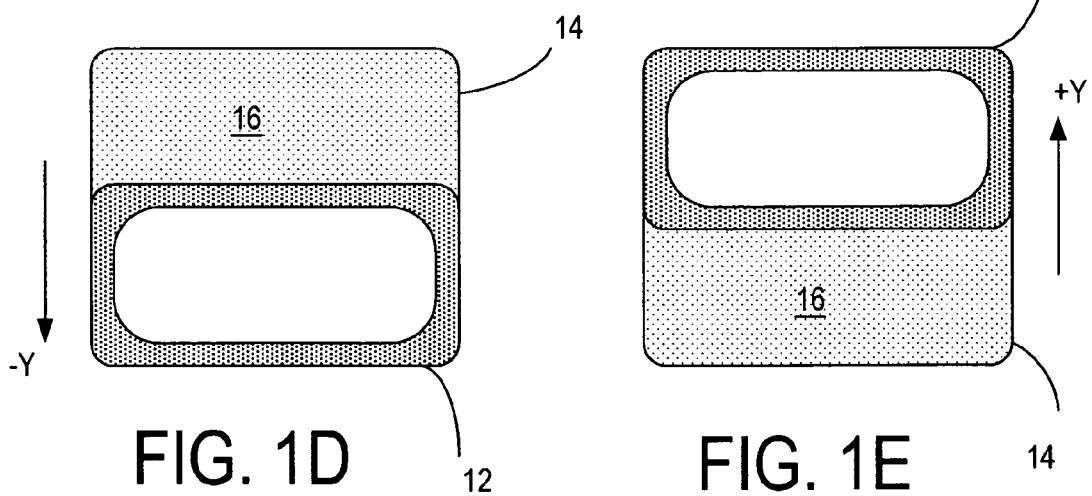
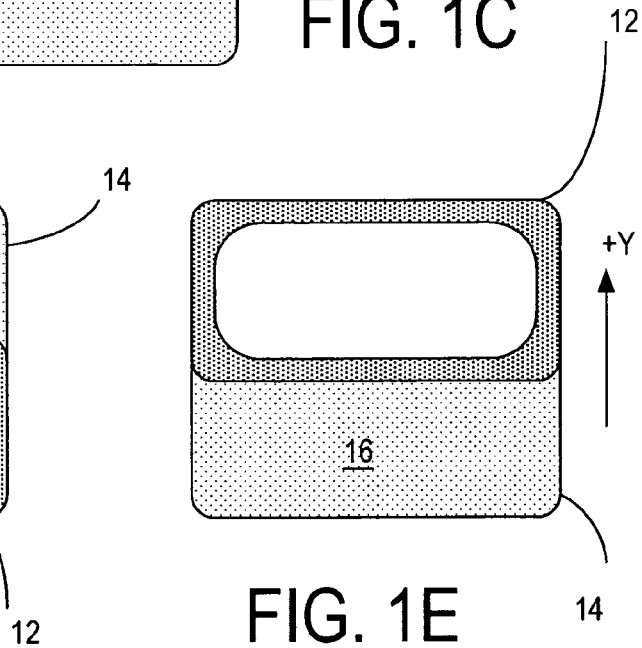

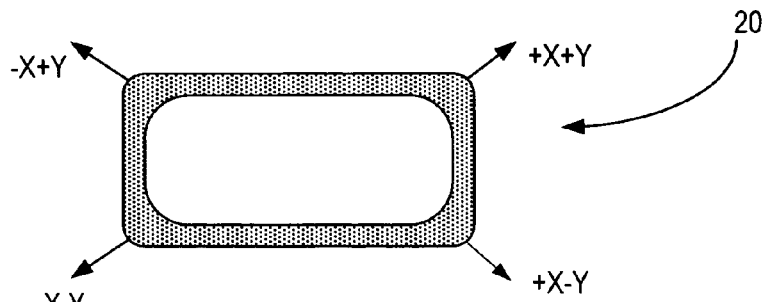
FIG. 2A
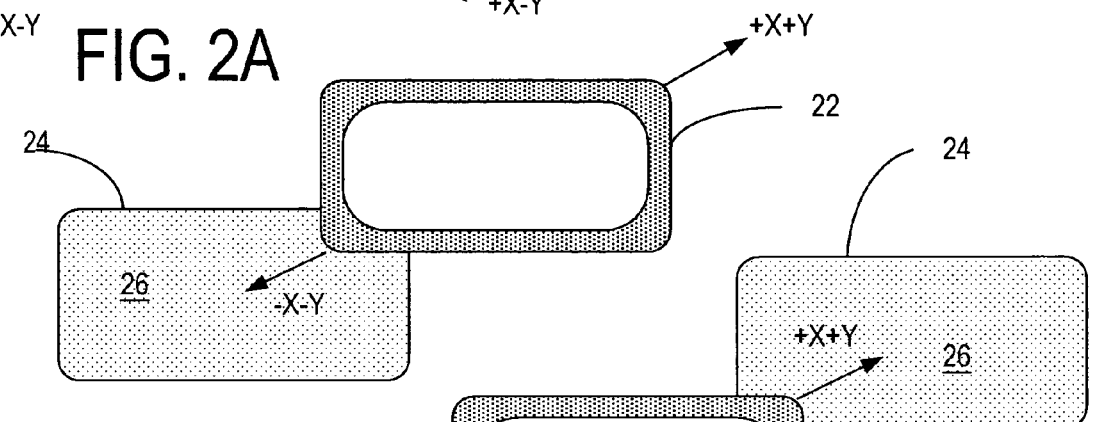
FIG. 2B
FIG. 2C
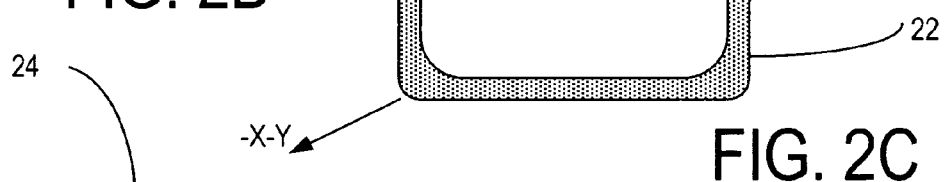
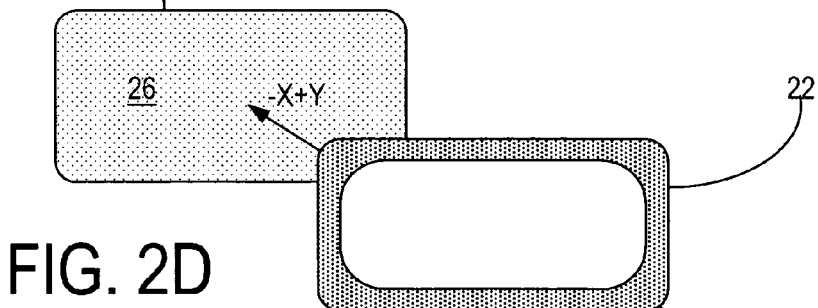
FIG. 2D
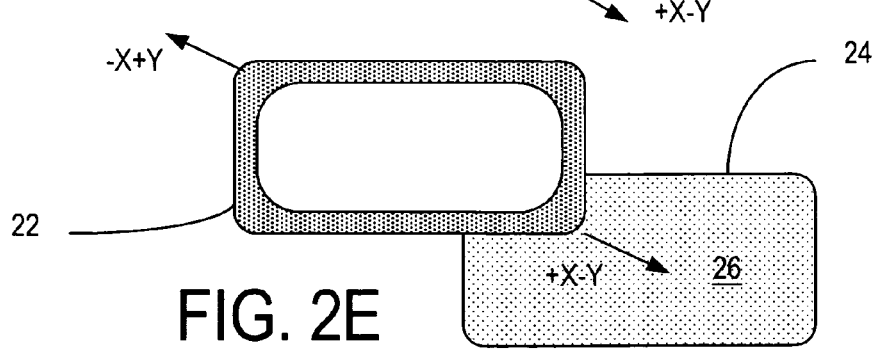
FIG. 2E

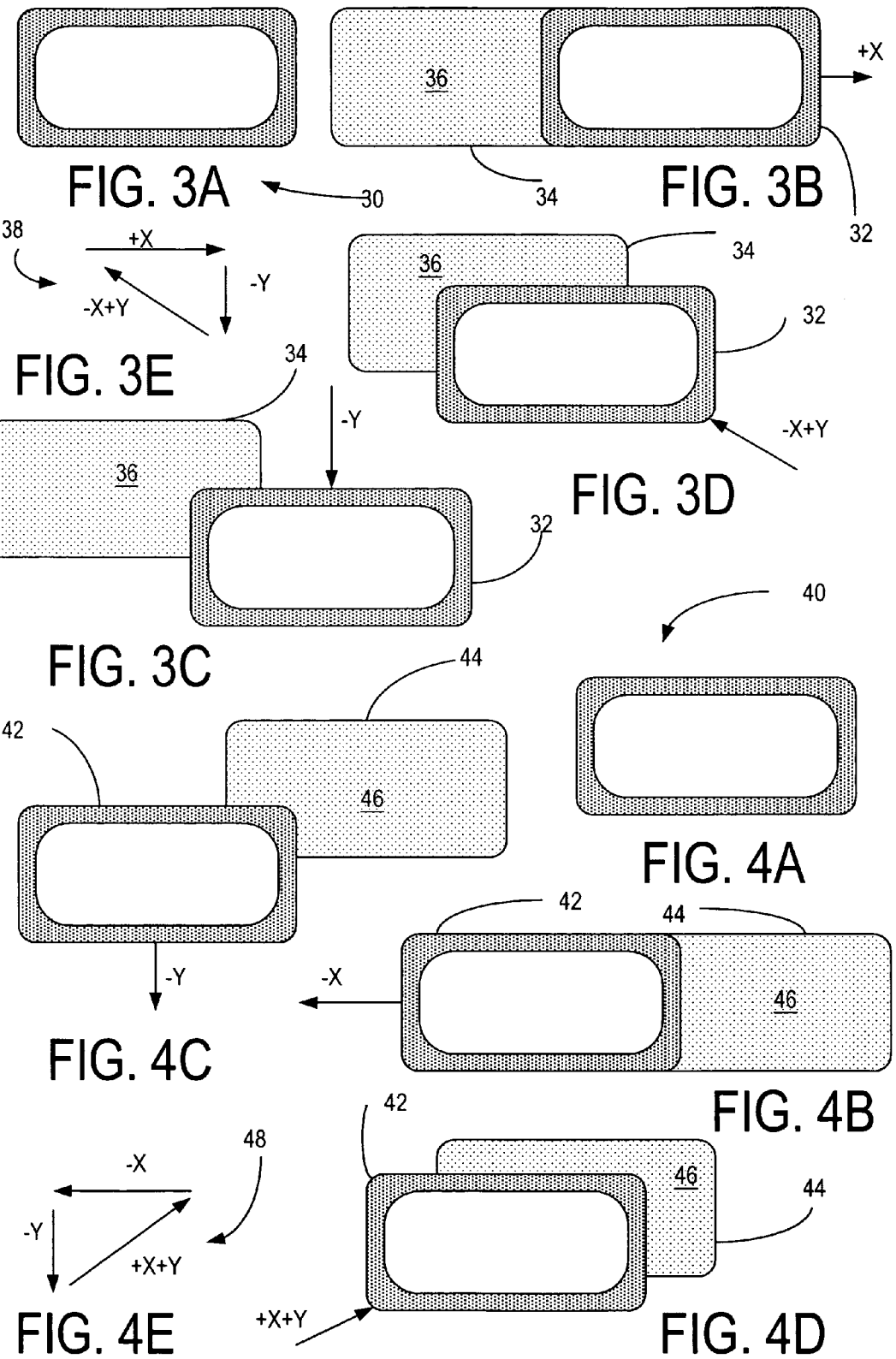

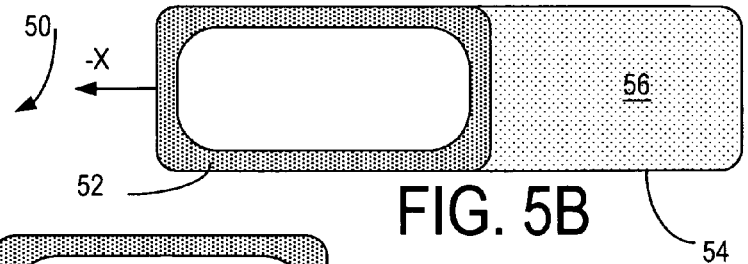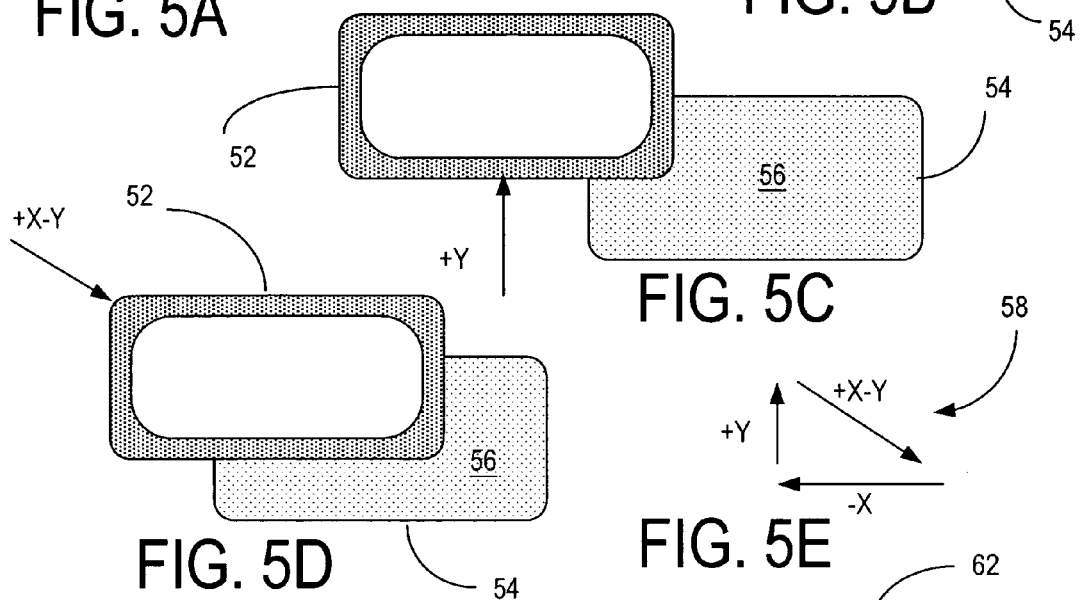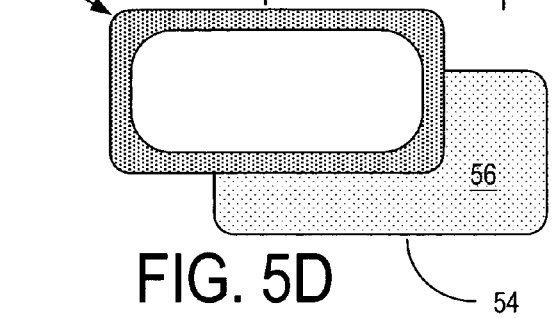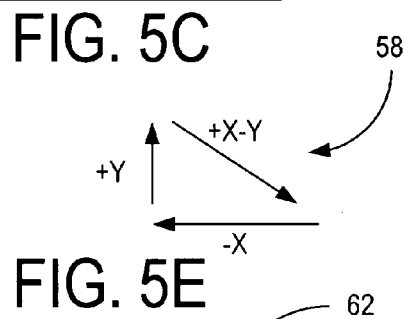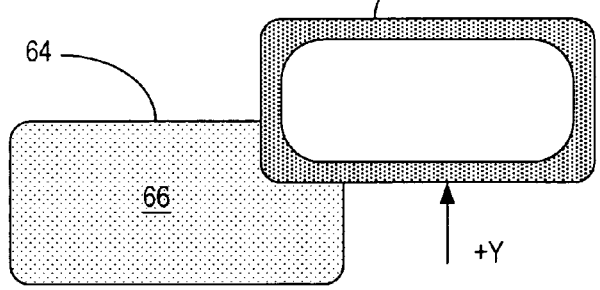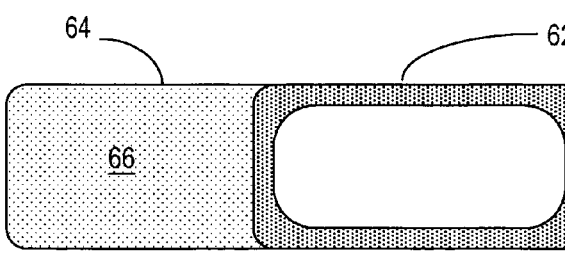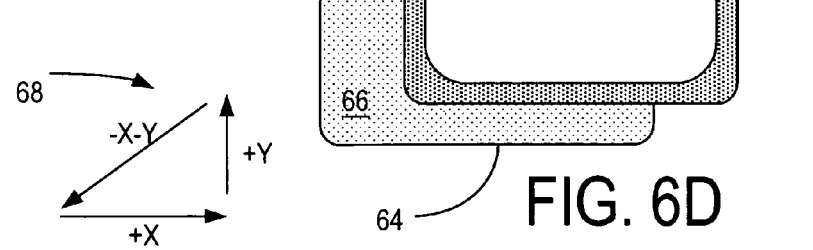

FIG. 7A
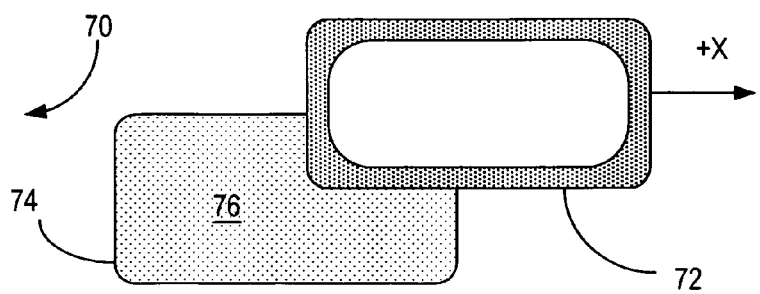
FIG. 7C
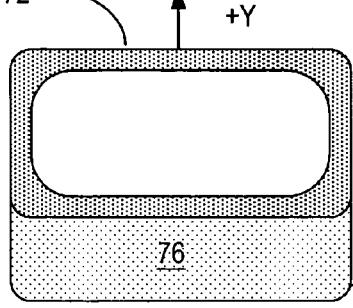
FIG. 7B
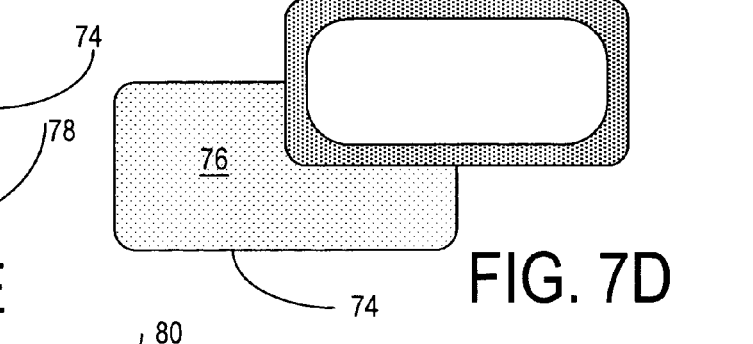
FIG. 7D
FIG. 7E
FIG. 8A
FIG. 8C
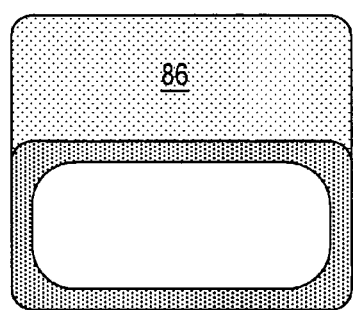
FIG. 8B
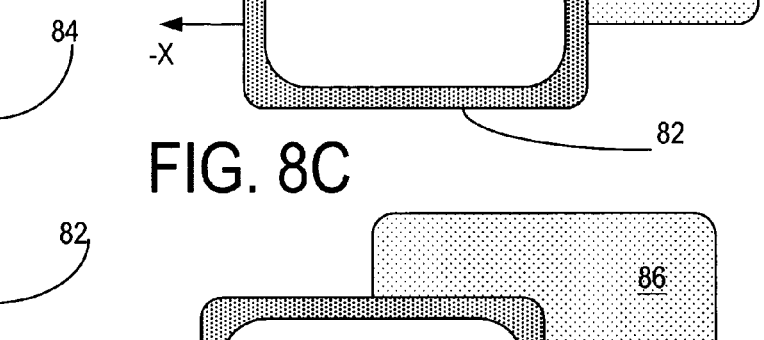
FIG. 8D
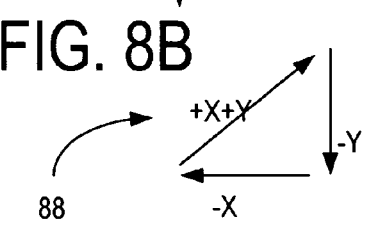
FIG. 8E

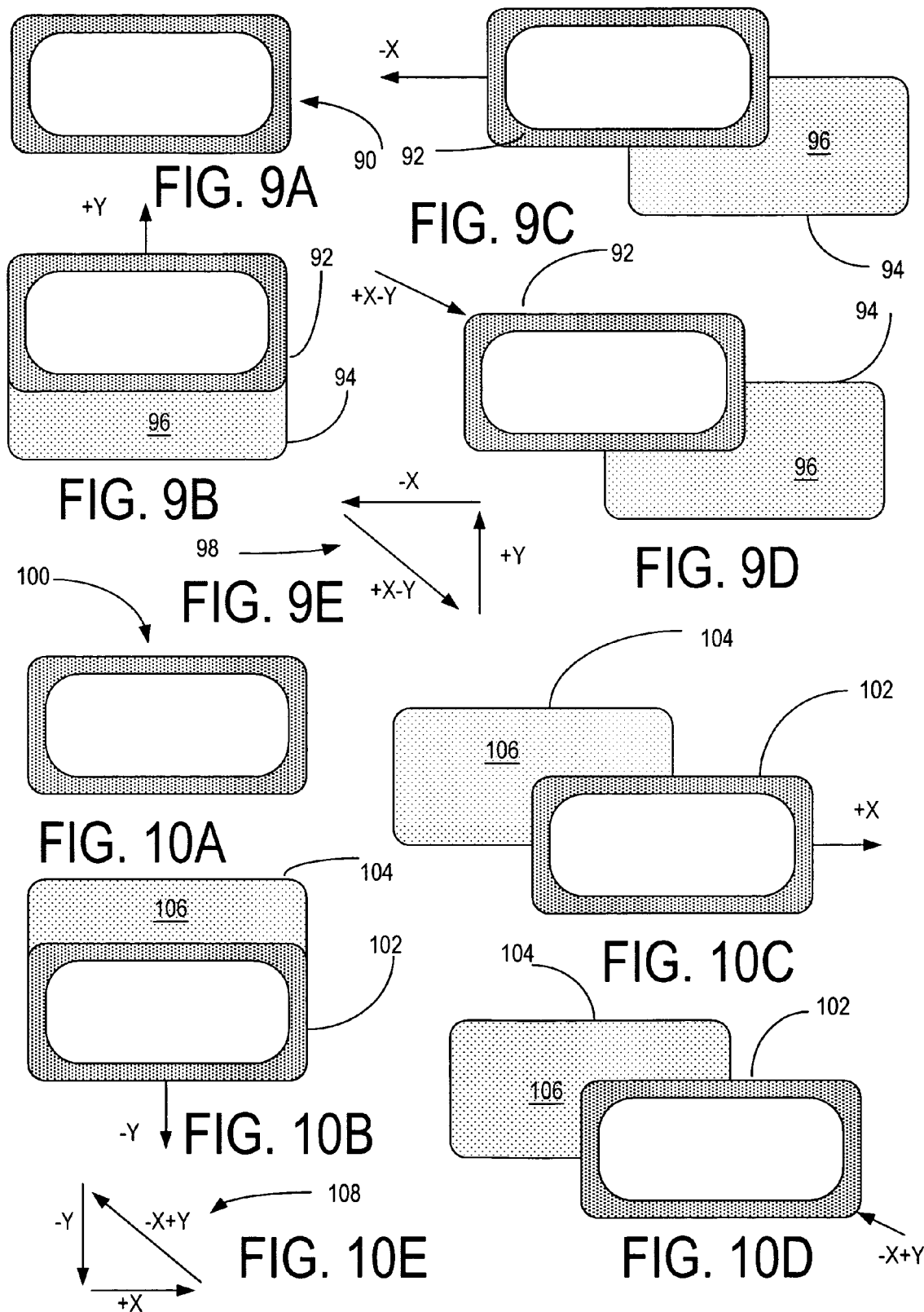

 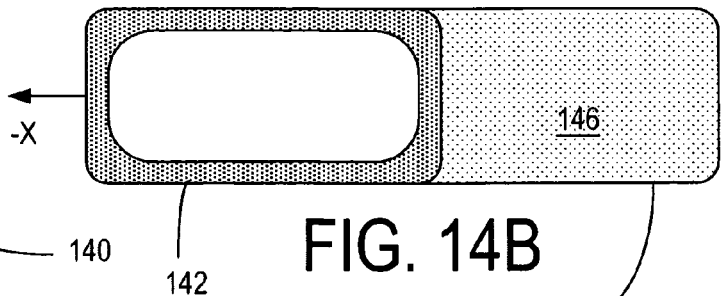
FIG. 14A  FIG. 14B
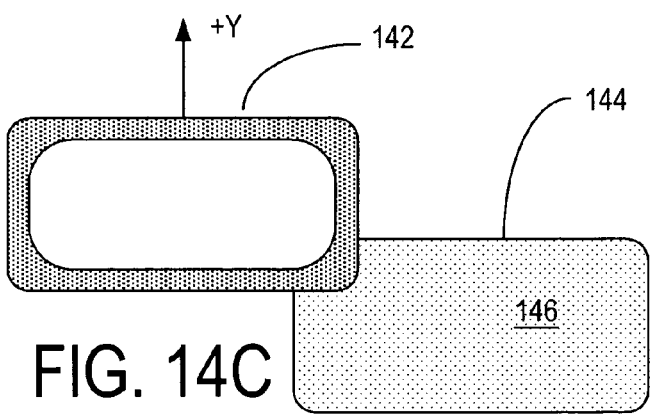 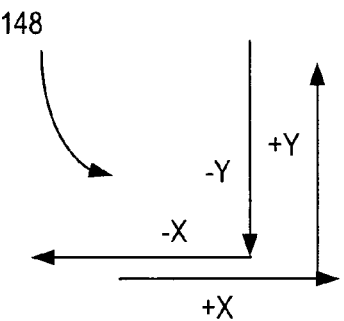
FIG. 14C
FIG. 14G
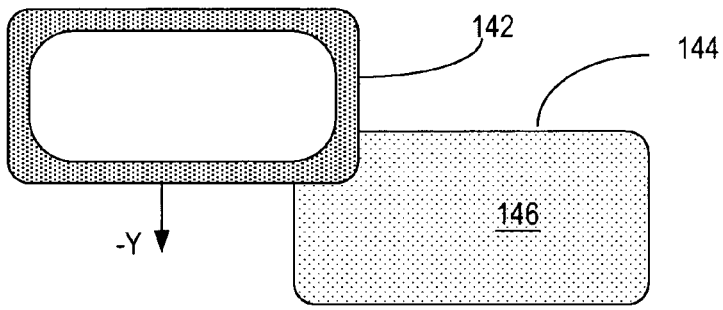
FIG. 14D
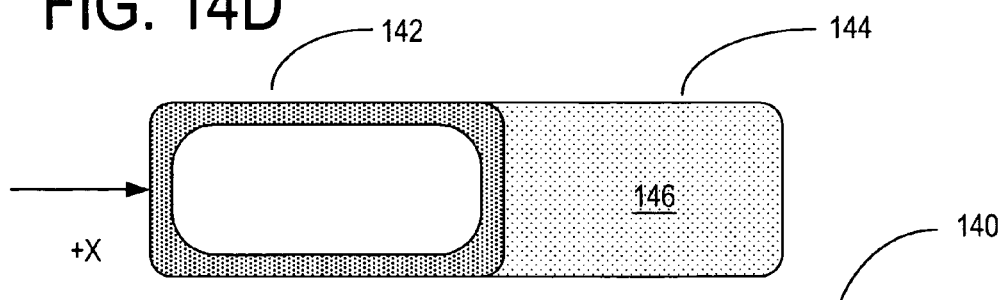
FIG. 14E
FIG. 14F

FIG. 15A
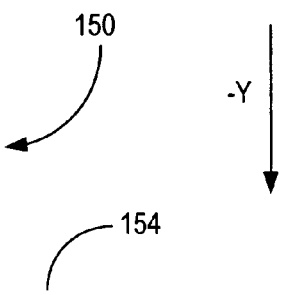
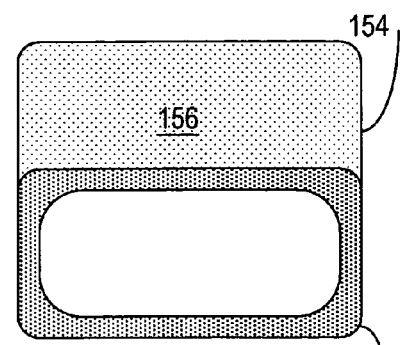
FIG. 15B
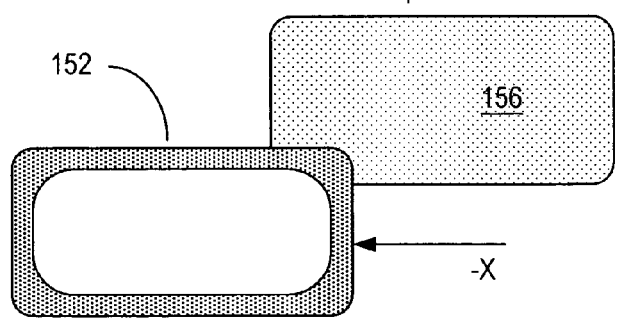
FIG. 15C
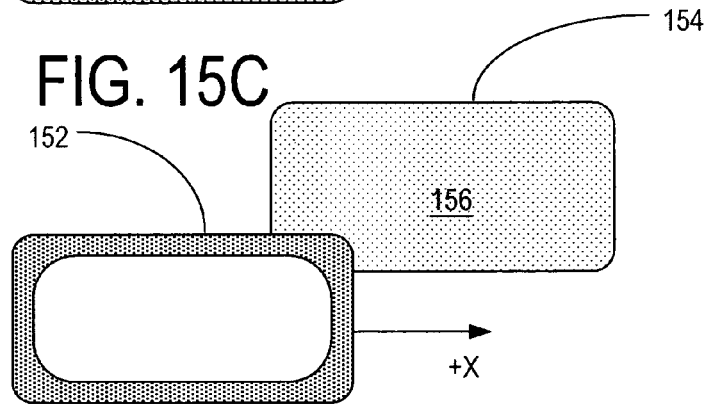
FIG. 15D
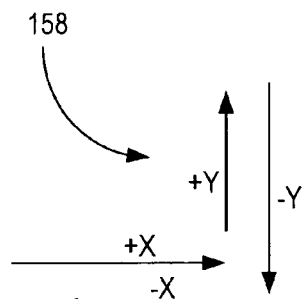
FIG. 15G
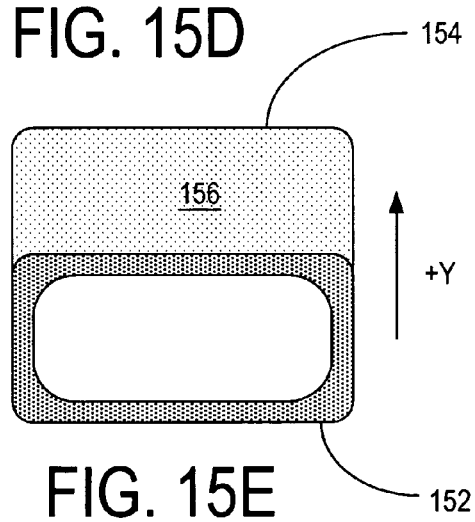
FIG. 15E
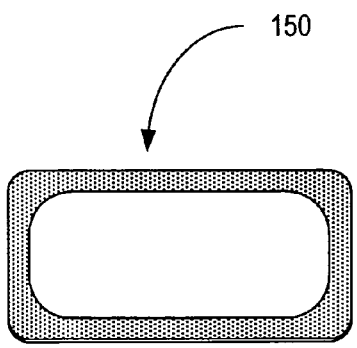
FIG. 15F

MULTI-POSITION DEVICE

TECHNICAL FIELD

The present invention relates generally to electronic devices, particularly portable electronic devices and more specifically to multi-position portable electronic devices having multiple body elements configurable to predetermined fixed orientations each of which define a respective different operative position.

BACKGROUND OF THE INVENTION

The demand by users and the purchasing public that portable electronic devices, particularly mobile telephone devices, become increasing smaller and lighter while at the same time providing an increasing number of different functions in addition to the basic telephone communication functions places a premium on available surface space for the user interfaces necessary to carryout the intended functions and operations of the associated features. In addition, there is also a demand for larger size screens for displaying images, for example, taken with a camera built into the mobile telephone or for displaying received images such as streaming video. This demand has required the manufacturer of such devices to design and develop innovative device enclosures with form factors capable of reconfiguration from one operative position to another to provide the necessary user interface to operate the device and create a good user experience.

It is known in the mobile telephone device enclosure art to provide a "flip" form factor in which the cover of the device is hinged to a main body element which carries a user interface relative to usage and the cover is "flipped" to open the device to make the user interface assessable to the user. The inside surface of the cover carries a screen to display alphanumeric characters, graphics, images and other representations common to such mobile telephone devices and which are commonly known in the trade and by the consuming public. The "flip" enclosure form factor configuration expands the user interface surface and provides a larger screen display area while maintaining a relatively smaller size device enclosure compared to other mobile telephone device form factors in which the user interface and the screen share a common surface area.

It is also known in the mobile telephone device enclosure art to provide a "slide" form factor in which the cover overlays a main body element and is arranged for linear sliding engagement with the main body element. The cover often carries a screen and may include keys to carry out various intended functions of the device when the cover is in its overlying operative position. The device is configured to a second operative position when the user slides the cover to expose a surface of the main body element which carries a user interface which may be an arrangement of keys for example, in a desired pattern to carry out the intended function such as inputting a telephone number or entry of alphanumeric characters to the device in a well known manner. The user slides the cover in the reverse direction to return the device is returned to its closed operative position. Although "slide" phone device form factors provide ease of usage in changing from one operative position to another operative position, the increase in effective user interface area is not as effective as "flip" phones because of the limited movement of the cover with respect to the main body element.

Accordingly, there is a need to provide a portable electronic device form factor that overcomes the limitations and disadvantages of the known portable electronic device form factors in which one body element is arranged to move relative to another body element to increase the effective user interface area.

It is an object of the present therefore to provide a multi-position device form factor in which one body element is arranged to slide relative to another body element to configure the body elements in a number of different predetermined fixed orientations each of which define a different non-overlapping operative position.

It is a further object of the present invention to provide a multi-position device form factor in which the body elements are arranged to move in a common plane relative to one another in X, Y, and XY coordinate directions.

SUMMARY OF THE INVENTION

In accordance with the invention, a multi-position device is presented and has first and second body elements configured for sliding engagement and constrained movement with respect to one another along a common plane in X, Y and XY coordinate directions for positioning the body elements in multiple different fixed positions relative to one another and for accessing one or more user interfaces carried on an outward facing surface of one body element covered by the other body element. The body elements are arranged to move relative to another from an overlapping alignment along linear, L-shaped and triangular paths in X, Y and XY coordinate directions back to the original overlapping alignment.

In a further aspect of the invention, a computer program is presented. The computer program is carried on a storage medium and executable by a processor in the multi-position device for automatically changing, if required, the orientation of information shown on a display of the multi-position device when the multi-position device is in a functional fixed position in a portrait or landscape operative position.

BRIEF DESCRIPTION OF THE DRAWINGS

Additional features, objects and advantages of the present invention will become readily apparent from the following written description taken in conjunction with the drawings wherein:

FIGS. 1A-1E show schematic representations of the body elements of a multi-position device embodying the invention for movement in a common plane from an overlapping alignment along a rectilinear path back to the overlapping alignment in a direction defined by any one of coordinate movements (+X, −X), (−X, +X), (+Y, −Y), (−Y, +Y);

FIGS. 2A-2E show schematic representations of the body elements of a multi-position device embodying the invention for movement in a common plane from an overlapping alignment along a diagonal path back to the overlapping alignment in a direction defined by any one of coordinate movements (+X+Y, −X−Y), (−X−Y, +X+Y), (+X−Y, −X+Y), (+X+Y, +X−Y);

FIGS. 3A-3E show schematic representations of the body elements of a multi-position device embodying the invention for movement from an overlapping alignment along a triangular path back to the overlapping alignment in a direction defined by the coordinate movements (+X, −Y, −X+Y);

FIGS. 4A-4E show schematic representations of the body elements of a multi-position device embodying the invention for movement from an overlapping alignment along a triangular path back to the overlapping alignment in a direction defined by the coordinate movements (−X, −Y, +X+Y);

FIGS. 5A-5E show schematic representations of the body elements of a multi-position device embodying the invention for movement from an overlapping alignment along a triangular path back to the overlapping alignment in a direction defined by the coordinate movements (−X, +Y, +X−Y);

FIGS. 6A-6E show schematic representations of the body elements of a multi-position device embodying the invention for movement from an overlapping alignment along a triangular path back to the overlapping alignment in a direction defined by the coordinate movements (+X, +Y, −X−Y);

FIGS. 7A-7E show schematic representations of the body elements of a multi-position device embodying the invention for movement from an overlapping alignment along a triangular path back to the overlapping alignment in a direction defined by the coordinate movements (+Y, +X, −X−Y);

FIGS. 8A-8E show schematic representations of the body elements of a multi-position device embodying the invention for movement from an overlapping alignment along a triangular path back to the overlapping alignment in a direction defined by the coordinate movements (−Y, −X, +X+Y);

FIGS. 9A-9E show schematic representations of the body elements of a multi-position device embodying the invention for movement from an overlapping alignment along a triangular path back to the overlapping alignment in a direction defined by the coordinate movements (+Y, −X, +X−Y);

FIGS. 10A-10E show schematic representations of the body elements of a multi-position device embodying the invention for movement from an overlapping alignment along a triangular path back to the overlapping alignment in a direction defined by the coordinate movements (−Y, +X, −X+Y);

FIGS. 14A-14G show schematic representations of the body elements of a multi-position device embodying the invention for movement from an overlapping alignment along an L-shaped path back to the overlapping alignment in a direction defined by the coordinate movements (−X, +Y, −Y, +X);

FIGS. 15A-15G show schematic representations of the body elements of a multi-position device embodying the invention for movement from an overlapping alignment along an L-shaped path back to the overlapping alignment in a direction defined by the coordinate movements (−Y, −X, +X, +Y);

DESCRIPTION OF PREFERRED EMBODIMENTS

Figure 11A:
FIGS. 11A-11G show schematic representations of the body elements of a multi-position device embodying the invention for movement from an overlapping alignment along an L-shaped path back to the overlapping alignment in a direction defined by the coordinate movements (+X, −Y, +Y, −X)

Turning now to the drawings and considering the invention in further detail, FIGS. 1A-1E show schematic representations of a multi-position device generally designated 10 having a first body element 12 configured as the covering body element and a second body element 14 configured as the covered body element. The first body element 12 and the second body element 14 are suitably arranged in an overlapping alignment and configured for sliding engagement and constrained movement with respect to one another along a common plane in X, Y coordinate directions. The first and second body elements slide relative to one another in a common plane from an overlapping alignment along a rectilinear path back to the overlapping alignment in a direction defined by any one of coordinate movements (+X, −X), (−X, +X), (+Y, −Y), (−Y, +Y). The first and second body elements 12, 14 respectively, are slid to multiple different fixed positions relative to one another for accessing one or more portions of an outward facing surface 16 of the second body element 14 which is covered by the first body element 12 in the overlapping alignment position.

Now considering FIGS. 2A-2E, schematic representations of an alternate embodiment of a multi-position device of the invention are illustrated therein and generally designated 20. The multi-position device 20 has a first body element 22 configured as the covering body element and a second body element 24 configured as the covered body element. The first body element 22 and the second body element 24 are suitably arranged in an overlapping alignment and configured for sliding engagement and constrained movement with respect to one another along a common plane in XY coordinate directions. The first and second body elements slide relative to one another in a common plane from an overlapping alignment along a diagonal rectilinear path back to the overlapping alignment in a direction defined by any one of coordinate movements (+X+Y, −X−Y), (−X−Y, +X+Y), (+X−Y, −X+Y), (−X+Y, +X−Y). The first and second body elements 22, 24 respectively, are slid to multiple different fixed positions relative to one another for accessing one or more portions of an outward facing surface 26 of the second body element 24 which is covered by the first body element 22 in the overlapping alignment position.

A further alternate embodiment of the multi-position device embodying the invention is illustrated schematically in FIGS. 3A-3E and generally designated 30. The multi-position device 30 has a first body element 32 configured as the covering body element and a second body element 34 configured as the covered body element. The first body element 32 and the second body element 34 are suitably arranged in an overlapping alignment and configured for sliding engagement and constrained movement with respect to one another along a common plane in X, Y, and XY coordinate directions. The first and second body elements slide relative to one another in a common plane from an overlapping alignment along a triangular path generally designated 38 back to the overlapping alignment in a direction defined by the coordinate movements (+X, −Y, −X+Y). The first and second body elements 32, 34 respectively, are slid to multiple different fixed positions relative to one another as illustrated in FIGS. 3B and 3C for accessing one or more portions of an outward facing surface 36 of the second body element 34 which is covered by the first body element 32 in the overlapping alignment position as illustrated in FIG. 3A.

FIGS. 4A-4E illustrate schematically a further alternate embodiment of the multi-position device embodying the invention and is generally designated 40 therein. The multi-position device 40 has a first body element 42 configured as the covering body element and a second body element 44 configured as the covered body element. The first body element 42 and the second body element 44 are suitably arranged in an overlapping alignment and configured for sliding engagement and constrained movement with respect to one another along a common plane in X, Y, and XY coordinate directions. The first and second body elements slide relative to one another in a common plane from an overlapping alignment along a triangular path generally designated 48 back to the overlapping alignment in a direction defined by the coordinate movements (−X, −Y, +X+Y). The first and second body elements 42, 44 respectively, are slid to multiple different fixed positions relative to one another as illustrated in FIGS. 4B and 4C for accessing one or more portions of an outward facing surface 46 of the second body element 44 which is covered by the first body element 42 in the overlapping alignment position as illustrated in FIG. 4A.

A yet further alternate embodiment of the multi-position device embodying the invention is illustrated schematically in FIGS. 5A-5E and generally designated 50. The multi-position device 50 has a first body element 52 configured as the covering body element and a second body element 54 configured as the covered body element. The first body element 52 and the second body element 54 are suitably arranged in an overlapping alignment and configured for sliding engagement and constrained movement with respect to one another along a common plane in X, Y, and XY coordinate directions. The first and second body elements slide relative to one another in a common plane from an overlapping alignment along a triangular path generally designated 58 back to the overlapping alignment in a direction defined by the coordinate movements (−X, +Y, +X−Y). The first and second body elements 52, 54 respectively, are slid to multiple different fixed positions relative to one another as illustrated in FIGS. 5B and 5C for accessing one or more portions of an outward facing surface 56 of the second body element 54 which is covered by the first body element 52 in the overlapping alignment position as illustrated in FIG. 5A.

A still further alternate embodiment of the multi-position device embodying the invention is illustrated schematically in FIGS. 6A-6E and generally designated 60. The multi-position device 60 has a first body element 62 configured as the covering body element and a second body element 64 configured as the covered body element. The first body element 62 and the second body element 64 are suitably arranged in an overlapping alignment and configured for sliding engagement and constrained movement with respect to one another along a common plane in X, Y, and XY coordinate directions. The first and second body elements slide relative to one another in a common plane from an overlapping alignment along a triangular path generally designated 68 back to the overlapping alignment in a direction defined by the coordinate movements (+X, +Y, −X−Y). The first and second body elements 62, 64, respectively, are slid to multiple different fixed positions relative to one another as illustrated in FIGS. 6B and 6C for accessing one or more portions of an outward facing surface 66 of the second body element 64 which is covered by the first body element 62 in the overlapping alignment position as illustrated in FIG. 6A.

In the multi-position device embodying the invention as illustrated in FIGS. 3A-3E, 4A-4E, 5A-5E and 6A-6E, the initial movement of the covering body element is in the X coordinate direction.

Another embodiment of the multi-position device of the invention is illustrated schematically in FIGS. 7A-7E and generally designated 70. The multi-position device 70 has a first body element 72 configured as the covering body element and a second body element 74 configured as the covered body element. The first body element 72 and the second body element 74 are suitably arranged in an overlapping alignment and configured for sliding engagement and constrained movement with respect to one another along a common plane in X, Y, and XY coordinate directions. The first and second body elements slide relative to one another in a common plane from an overlapping alignment along a triangular path generally designated 78 back to the overlapping alignment in a direction defined by the coordinate movements (+Y, +X, −X−Y). The first and second body elements 72, 74 respectively, are slid to multiple different fixed positions relative to one another as illustrated in FIGS. 7B and 7C for accessing one or more portions of an outward facing surface 76 of the second body element 74 which is covered by the first body element 72 in the overlapping alignment position as illustrated in FIG. 7A.

A yet further alternate embodiment of the multi-position device embodying the invention is illustrated schematically in FIGS. 8A-8E and generally designated 80. The multi-position device 80 has a first body element 82 configured as the covering body element and a second body element 84 configured as the covered body element. The first body element 82 and the second body element 84 are suitably arranged in an overlapping alignment and configured for sliding engagement and constrained movement with respect to one another along a common plane in X, Y, and XY coordinate directions. The first and second body elements slide relative to one another in a common plane from an overlapping alignment along a triangular path generally designated 88 back to the overlapping alignment in a direction defined by the coordinate movements (−Y, −X, +X+Y). The first and second body elements 82, 84 respectively, are slid to multiple different fixed positions relative to one another as illustrated in FIGS. 8B and 8C for accessing one or more portions of an outward facing surface 86 of the second body element 84 which is covered by the first body element 82 in the overlapping alignment position as illustrated in FIG. 8A.

Another embodiment of the multi-position device of the invention is illustrated schematically in FIGS. 9A-9E and generally designated 90. The multi-position device 90 has a first body element 92 configured as the covering body element and a second body element 94 configured as the covered body element. The first body element 92 and the second body element 94 are suitably arranged in an overlapping alignment and configured for sliding engagement and constrained movement with respect to one another along a common plane in X, Y, and XY coordinate directions. The first and second body elements slide relative to one another in a common plane from an overlapping alignment along a triangular path generally designated 98 back to the overlapping alignment in a direction defined by the coordinate movements (+Y, −X, +X−Y). The first and second body elements 92, 94 respectively, are slid to multiple different fixed positions relative to one another as illustrated in FIGS. 9B and 9C for accessing one or more portions of an outward facing surface 96 of the second body element 94 which is covered by the first body element 92 in the overlapping alignment position as illustrated in FIG. 9A.

A yet further embodiment of the multi-position device of the invention is illustrated schematically in FIGS. 10A-10E and generally designated 100. The multi-position device 100 has a first body element 102 configured as the covering body element and a second body element 104 configured as the covered body element. The first body element 102 and the second body element 104 are suitably arranged in an overlapping alignment and configured for sliding engagement and constrained movement with respect to one another along a common plane in X, Y, and XY coordinate directions. The first and second body elements slide relative to one another in a common plane from an overlapping alignment along a triangular path generally designated 108 back to the overlapping alignment in a direction defined by the coordinate movements (+Y, −X, +X−Y). The first and second body elements 102, 104 respectively, are slid to multiple different fixed positions relative to one another as illustrated in FIGS. 10B and 10C for accessing one or more portions of an outward facing surface 106 of the second body element 104 which is covered by the first body element 102 in the overlapping alignment position as illustrated in FIG. 10A.

In the multi-position device embodying the invention as illustrated in FIGS. 7A-7E, 8A-8E, 9A-9E and 10A-10E, the initial movement of the covering body element is in the Y coordinate direction.

Figure 11B:
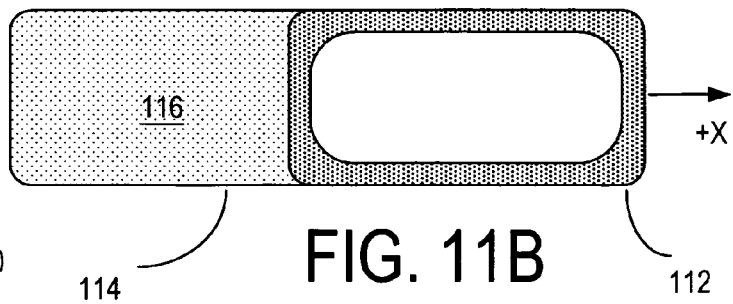
Figure 11C:
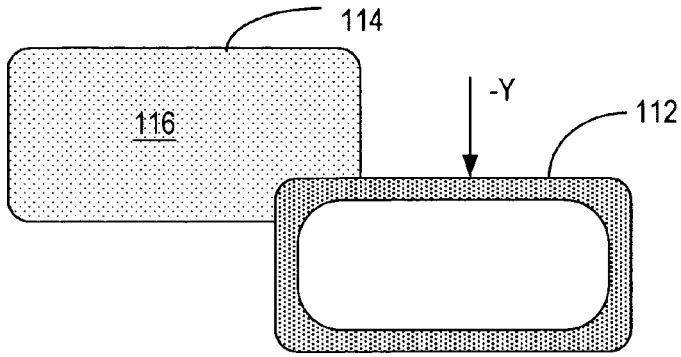
Figure 11G:
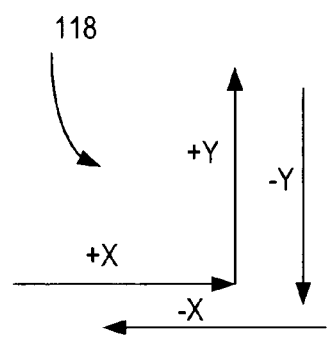
Figure 11D:
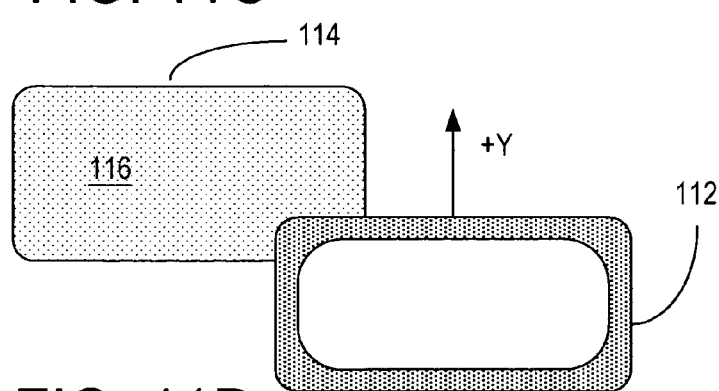
Figure 11E:
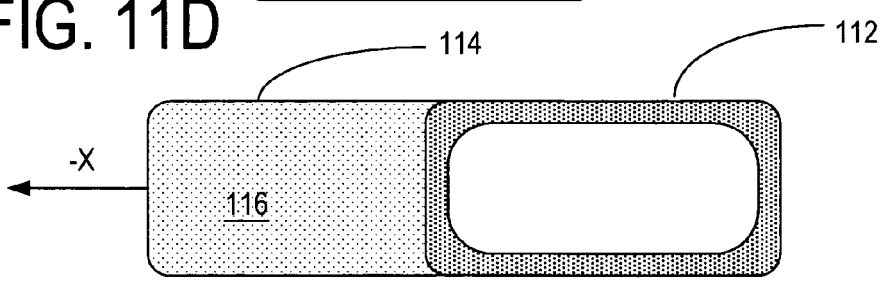
Figure 11F:

Now considering another embodiment of the multi-position device embodying the invention as illustrated schematically in FIGS. 11A-11G, the multi-position device is shown therein and generally designated 110. The multi-position device 110 has a first body element 112 configured as the covering body element and a second body element 114 configured as the covered body element. The first body element 112 and the second body element 114 are suitably arranged in an overlapping alignment and configured for sliding engagement and constrained movement with respect to one another along a common plane in X, and Y coordinate directions. The first and second body elements slide relative to one another in a common plane from an overlapping alignment as shown in FIG. 11A along an L-shaped path generally designated 118 back to the overlapping alignment as shown in FIG. 11G in a direction defined by the coordinate movements (+X, −Y, +Y, −X). The first and second body elements 112, 114 respectively, are slid to multiple different fixed positions relative to one another as illustrated in FIGS. 11B and 11C for accessing one or more portions of an outward facing surface 116 of the second body element 114 which is covered by the first body element 112 in the overlapping alignment position as illustrated in FIGS. 11A and 11F.

Figure 12A:
FIGS. 12A-12G show schematic representations of the body elements of a multi-position device embodying the invention for movement from an overlapping alignment along an L-shaped path back to the overlapping alignment in a direction defined by the coordinate movements (+X, +Y, −Y, −X)
Figure 12B:
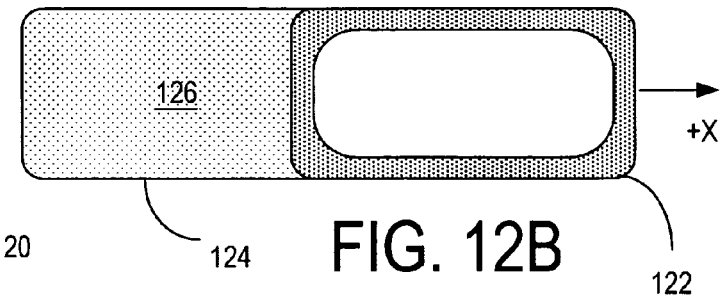
Figure 12C:
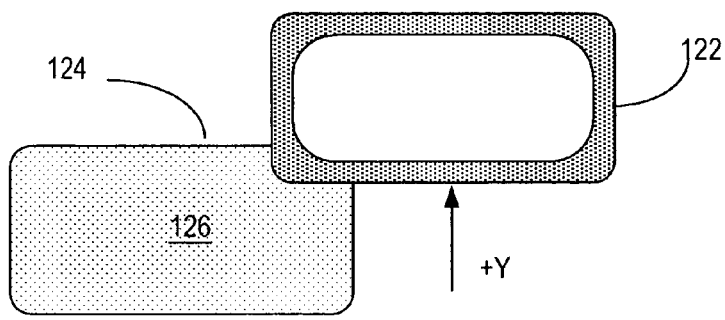
Figure 12G:
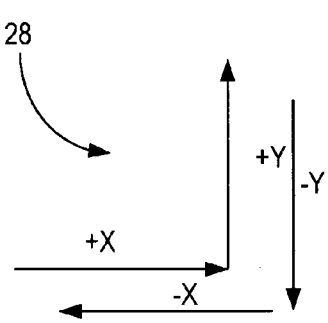
Figure 12D:
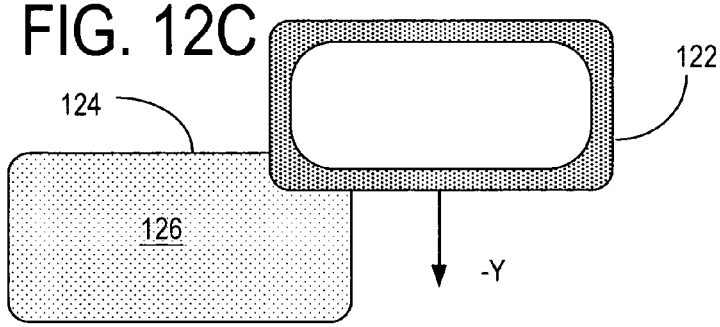
Figure 12E:
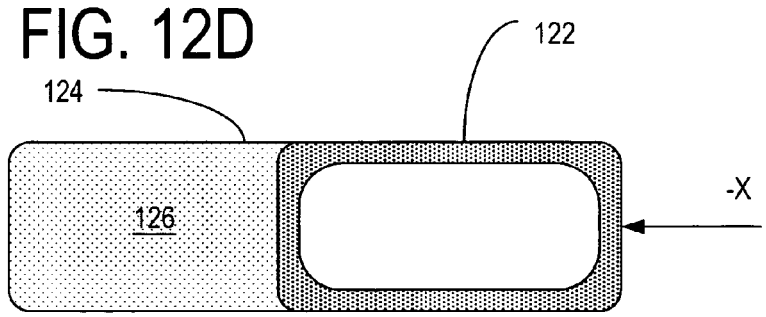
Figure 12F:

A further embodiment of the multi-position device embodying the invention as illustrated schematically in FIGS. 12A-12G, the multi-position device is shown therein and generally designated 120. The multi-position device 120 has a first body element 122 configured as the covering body element and a second body element 124 configured as the covered body element. The first body element 122 and the second body element 124 are suitably arranged in an overlapping alignment and configured for sliding engagement and constrained movement with respect to one another along a common plane in X, and Y coordinate directions. The first and second body elements slide relative to one another in a common plane from an overlapping alignment as shown in FIG. 12A along an L-shaped path generally designated 128 back to the overlapping alignment as shown in FIG. 12G in a direction defined by the coordinate movements (+X, +Y, −Y, −X). The first and second body elements 122, 124 respectively, are slid to multiple different fixed positions relative to one another as illustrated in FIGS. 12B and 12C for accessing one or more portions of an outward facing surface 126 of the second body element 124 which is covered by the first body element 122 in the overlapping alignment position as illustrated in FIGS. 12A and 12F.

Figure 13A:
FIGS. 13A-13G show schematic representations of the body elements of a multi-position device embodying the invention for movement from an overlapping alignment along an L-shaped path back to the overlapping alignment in a direction defined by the coordinate movements (−X, −Y, +Y, +X)
Figure 13B:
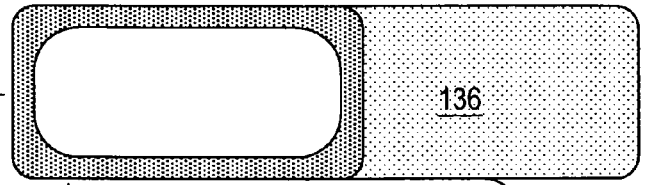
Figure 13C:
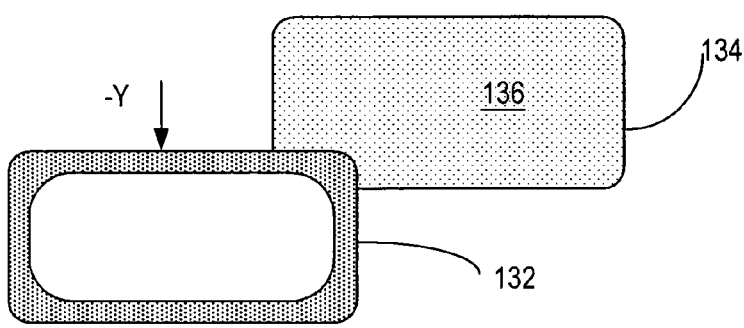
Figure 13G:
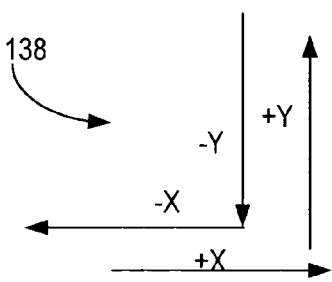
Figure 13D:
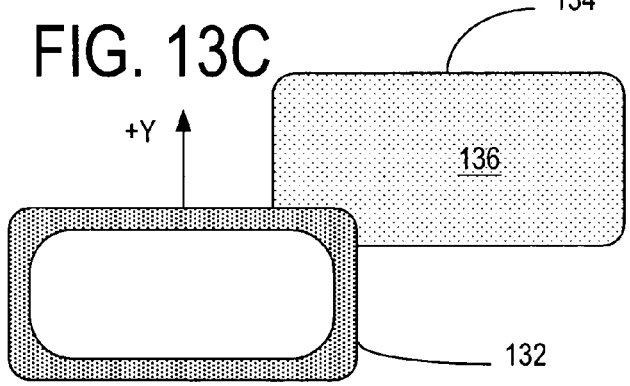
Figure 13E:
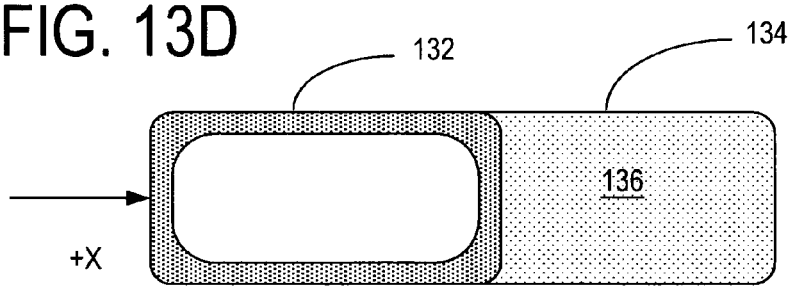
Figure 13F:

A still further embodiment of the multi-position device embodying the invention as illustrated schematically in FIGS. 13A-13G, the multi-position device is shown therein and generally designated 130. The multi-position device 130 has a first body element 132 configured as the covering body element and a second body element 134 configured as the covered body element. The first body element 132 and the second body element 134 are suitably arranged in an overlapping alignment and configured for sliding engagement and constrained movement with respect to one another along a common plane in X, and Y coordinate directions. The first and second body elements slide relative to one another in a common plane from an overlapping alignment as shown in FIG. 13A along an L-shaped path generally designated 138 back to the overlapping alignment as shown in FIG. 13G in a direction defined by the coordinate movements (−X, −Y, +Y, +X). The first and second body elements 132, 134 respectively, are slid to multiple different fixed positions relative to one another as illustrated in FIGS. 13B and 13C for accessing one or more portions of an outward facing surface 136 of the second body element 134 which is covered by the first body element 132 in the overlapping alignment position as illustrated in FIGS. 13A and 13F.

Another embodiment of the multi-position device embodying the invention as illustrated schematically in FIGS. 14A-14G, the multi-position device is shown therein and generally designated 140. The multi-position device 140 has a first body element 142 configured as the covering body element and a second body element 144 configured as the covered body element. The first body element 142 and the second body element 144 are suitably arranged in an overlapping alignment and configured for sliding engagement and constrained movement with respect to one another along a common plane in X, and Y coordinate directions. The first and second body elements slide relative to one another in a common plane from an overlapping alignment as shown in FIG. 14A along an L-shaped path generally designated 148 back to the overlapping alignment as shown in FIG. 14G in a direction defined by the coordinate movements (−X, +Y, −Y, +X). The first and second body elements 142, 144 respectively, are slid to multiple different fixed positions relative to one another as illustrated in FIGS. 14B and 14C for accessing one or more portions of an outward facing surface 146 of the second body element 144 which is covered by the first body element 142 in the overlapping alignment position as illustrated in FIGS. 14A and 14F.

In the multi-position device embodying the invention as illustrated in FIGS. 11A-11E, 12A-12E, 13A-13E and 14A-14E, the initial movement of the covering body element is in the X coordinate direction.

Now considering another embodiment of the multi-position device embodying the invention as illustrated schematically in FIGS. 15A-15G, the multi-position device is shown therein and generally designated 150. The multi-position device 150 has a first body element 152 configured as the covering body element and a second body element 154 configured as the covered body element. The first body element 152 and the second body element 154 are suitably arranged in an overlapping alignment and configured for sliding engagement and constrained movement with respect to one another along a common plane in X, and Y coordinate directions. The first and second body elements slide relative to one another in a common plane from an overlapping alignment as shown in FIG. 15A along an L-shaped path generally designated 158 back to the overlapping alignment as shown in FIG. 15G in a direction defined by the coordinate movements (−Y, −X, +X, +Y). The first and second body elements 152, 154 respectively, are slid to multiple different fixed positions relative to one another as illustrated in FIGS. 15B and 15C for accessing one or more portions of an outward facing surface 156 of the second body element 154 which is covered by the first body element 152 in the overlapping alignment position as illustrated in FIGS. 15A and 15F.

Figure 16A:
FIGS. 16A-16G show schematic representations of the body elements of a multi-position device embodying the invention for movement from an overlapping alignment along an L-shaped path back to the overlapping alignment in a direction defined by the coordinate movements (+Y, +X, −X, −Y)
Figure 16B:
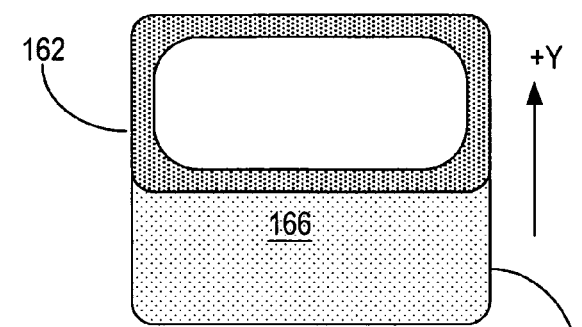
Figure 16C:
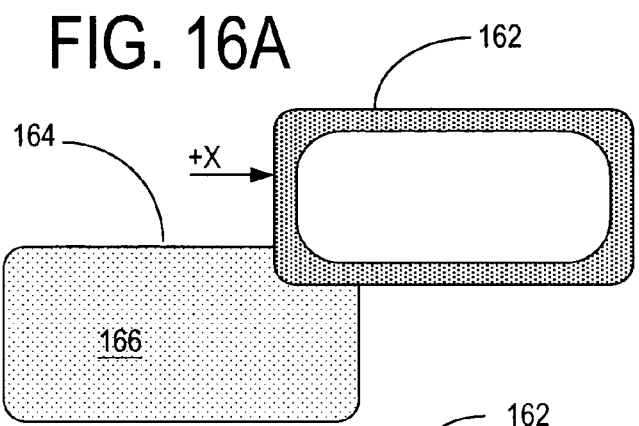
Figure 16D:
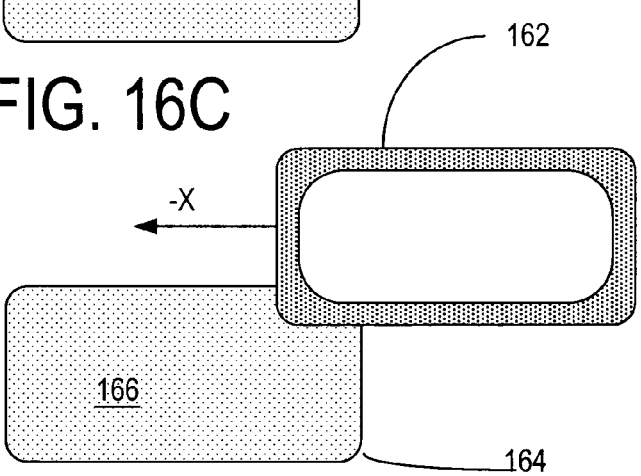
Figure 16G:
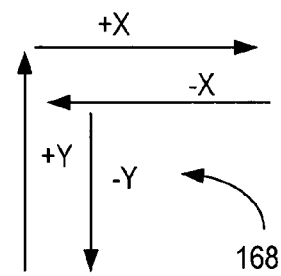
Figure 16E:
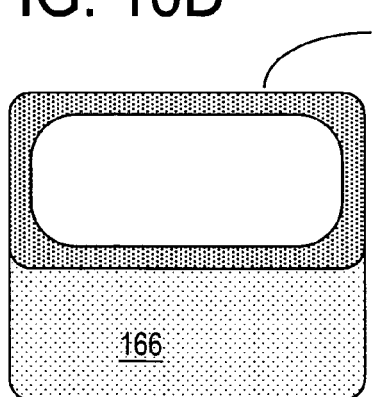
Figure 16F:
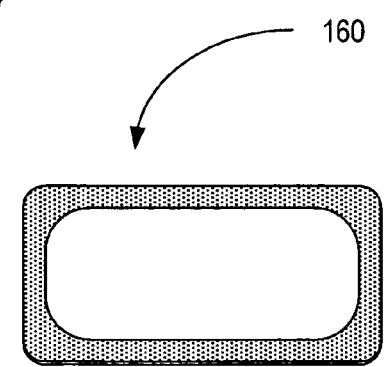

A further embodiment of the multi-position device embodying the invention as illustrated schematically in FIGS. 16A-16G, the multi-position device is shown therein and generally designated 160. The multi-position device 160 has a first body element 162 configured as the covering body element and a second body element 164 configured as the covered body element. The first body element 162 and the second body element 164 are suitably arranged in an overlapping alignment and configured for sliding engagement and constrained movement with respect to one another along a common plane in X, and Y coordinate directions. The first and second body elements slide relative to one another in a common plane from an overlapping alignment as shown in FIG. 16A along an L-shaped path generally designated 168 back to the overlapping alignment as shown in FIG. 16G in a direction defined by the coordinate movements (+Y, +X, −X, −Y). The first and second body elements 162, 164 respectively, are slid to multiple different fixed positions relative to one another as illustrated in FIGS. 16B and 16C for accessing one or more portions of an outward facing surface 166 of the second body element 164 which is covered by the first body element 162 in the overlapping alignment position as illustrated in FIGS. 16A and 16F.

In the multi-position device embodying the invention as illustrated in FIGS. 15A-15E, and 16A-16E, the initial movement of the covering body element is in the Y coordinate direction. Although not shown in the figures, the multi-position device embodying the invention also contemplates the first and second body elements arranged to slide relative to one another in a common plane from an overlapping alignment along an L-shaped path back to the overlapping alignment in a direction defined by the coordinate movements (−Y, +X, −X, +Y) and (+Y, −X, +X, −Y).

It is contemplated that the multi-position device embodying the invention be configured with a display screen constructed in at least one of the first and second body elements. It is also contemplated that the multi-position device embodying the invention be configured with at least one user interface carried on the outward facing surface of the first or second body elements.

Figure 17A:
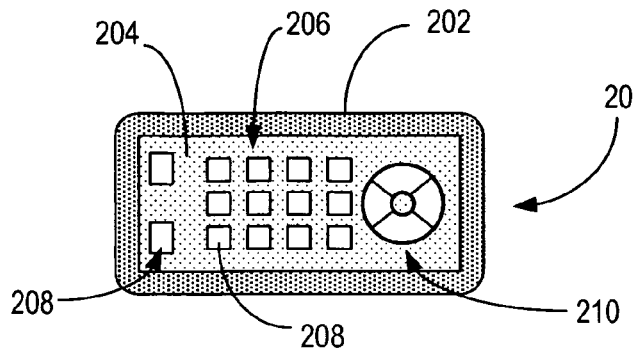
FIGS. 17A-17D show a schematic representation of the multi-position device embodying the invention configured as a mobile communication device with gaming functionality.
Figure 17B:
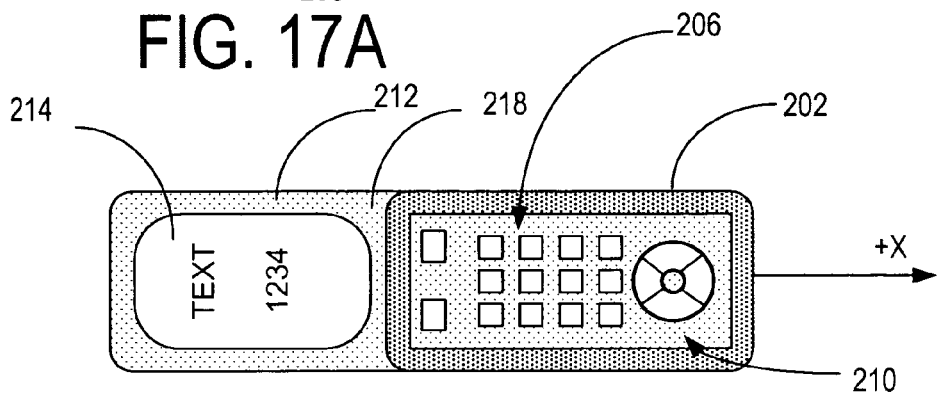
Figure 17C:
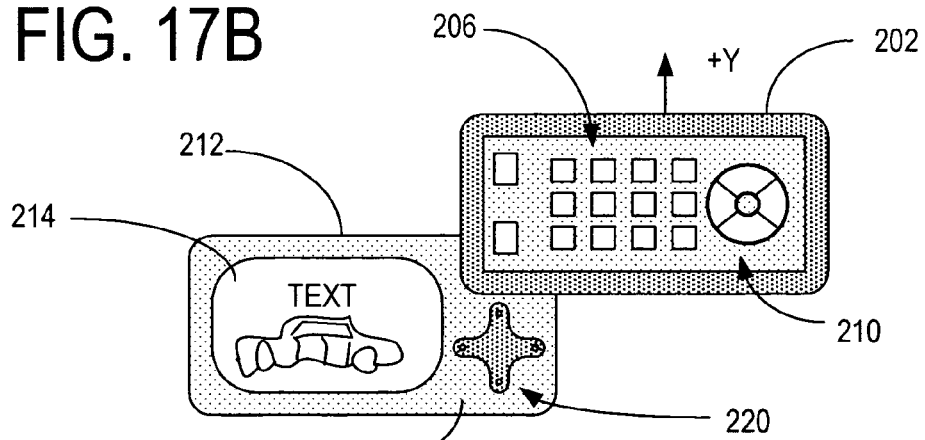
Figure 17D:
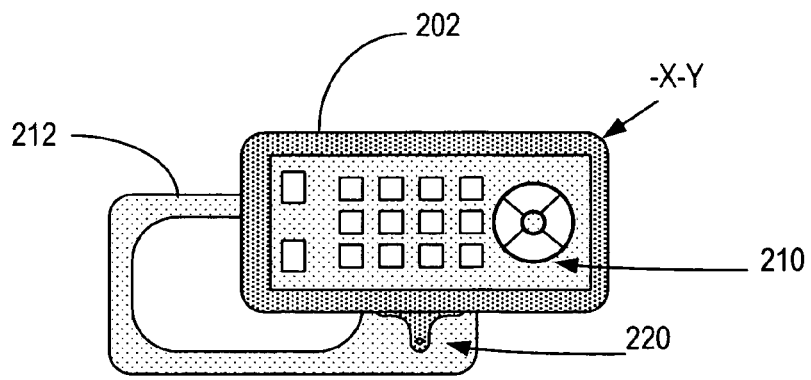

Turning now to FIGS. 17A-17B, a multi-position device embodying the invention is illustrated therein configured as a mobile communication device generally designated 200. The mobile communication device 200 has a first or covering body element generally designated 202 and an outward facing surface 204. A first user interface generally designated 206 includes keys 208, 208 carried on the surface 204 and arranged to carryout the intended functions of the mobile communication device 200. A second user interface generally designated 210 is also carried on the surface 204 and may be for example, a navigational input device well known to those skilled in the art and to the consuming public. The covering body element 202 is slid in the X coordinate direction to configure the mobile communication device in a first operative fixed position as illustrated in FIG. 17B in which the second or covered body element generally designated 212 is revealed. A screen 214 is constructed in the second body element 212 to display text, graphics, alpha-numeric characters or other indicia and information of the intended functionality of the mobile communication device. The mobile communication device 200 is held in the portrait operating position and the screen display is properly oriented for portrait operation. The covering body element 202 of the mobile communication device 200 is slid in the Y coordinate direction to reposition the covering body element 202 in a different fixed position relative to the covered body element 212 to reveal a further user interface 220 that was covered by the covering body element 202 in the first operative fixed position. As shown, the mobile communication device is now held and operated in a landscape orientation and the display text, graphics, alpha-numeric characters or other indicia and information of the intended functionality of the mobile communication device is automatically properly oriented when the covering body element 202 is slid in the Y coordinate direction. The mobile communication device 200 is restored to its closed fixed position by sliding the covering element 202 in the −X−Y coordinate direction as shown in FIG. 17D.

The user interfaces are not limited to those shown and may be configured for example, as a function keyboard, game controller, joystick, communication keypad, volume control, channel selector, TV-control, radio control, music player control, camera function control or other suitable user interface to carryout the associated corresponding intended function of the device.

Figure 18:
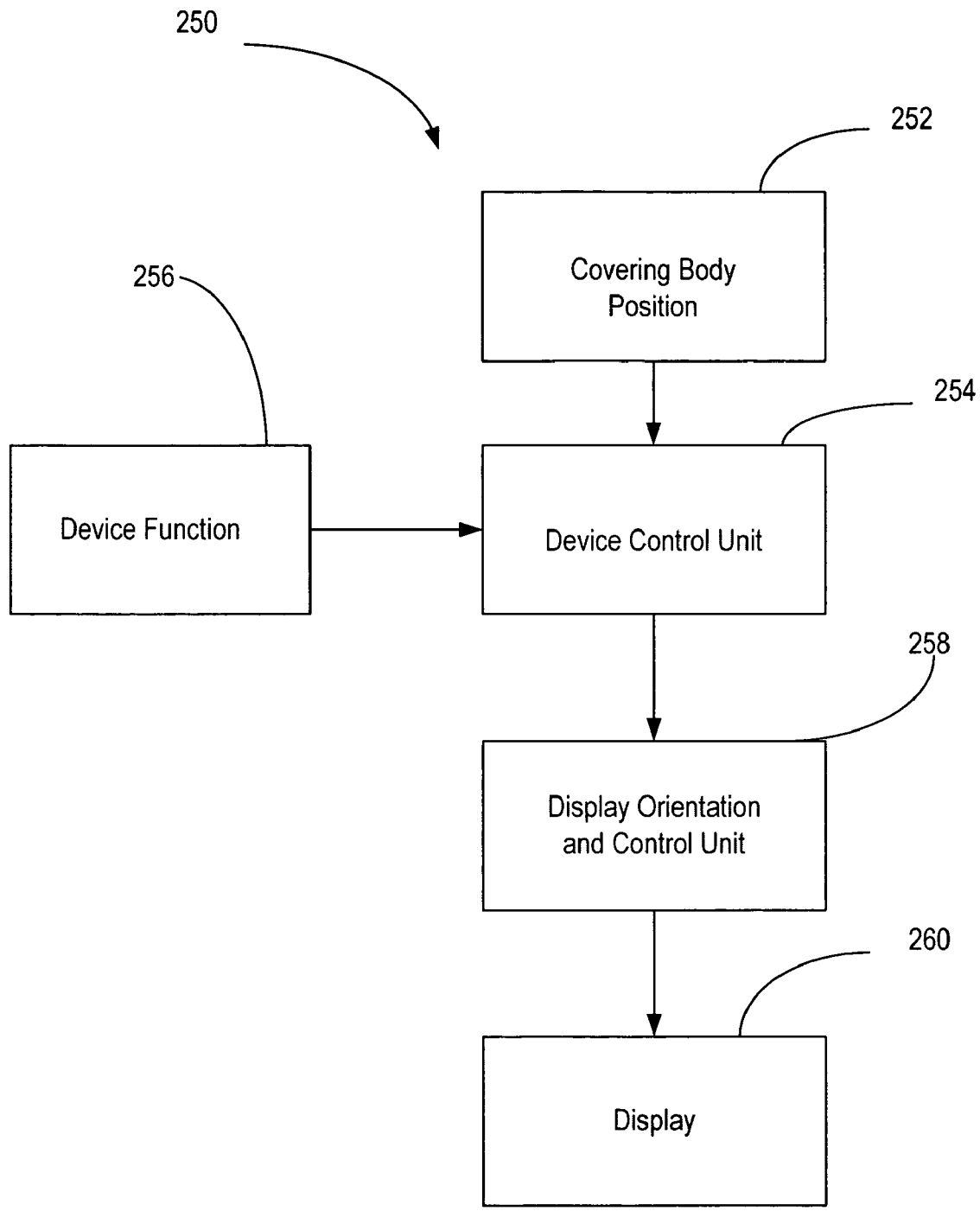
FIG. 18 is a functional block diagram of the control system of the mobile communication device configured with the multi-position device form factor embodying the invention.

The orientation of the display and other operative functions of the multi-position device configured as a mobile communication device as discussed above are carried out by means of a system control unit 250 which is illustrated for example in the schematic functional block diagram of FIG. 18. A covering body element position indicator 252 provides a signal to the device control unit 254 in response to the covering body element 202 being in the first fixed operative or portrait position as shown in FIG. 17B. The device control unit 254 may be a microprocessor, digital signal processor, a display driver or other means including both the hardware and software for carrying out the control function as well as other intended and desirable functions and may contain a suitable memory for storing respective related computer programs to perform and control the intended functions as is well known by those skilled in the art and therefore not described in detail herein. The device control unit 254 may be manually operated by the user by means of a key or other operative stimulus to provide a suitable signal to the device function 256 and which device function signal is coupled to the device control unit 254. The device control unit 254 provides an output signal corresponding to the desired orientation of the display to a display orientation and control unit 258 to orient the graphic or text shown on the display 260 as needed.

A computer program carried on a storage medium and executable by a processor in a multi-position device for automatically changing, if required, the orientation of information shown on a display of the multi-position device when the multi-position device is in a functional fixed position in a portrait or landscape operative position is also contemplated in the present invention. The multi-position device is configured with first and second body elements arranged in an overlapping alignment and configured for sliding engagement and constrained movement with respect to one another along a common plane in X, Y and XY coordinate directions for positioning said first and second body elements in multiple different fixed positions relative to one another for accessing one or more portions of an outward facing surface of one of the first and second body elements covered by the other of the first and second body elements when in the overlapping alignment position. A display screen is constructed in at least one of the first and second body elements, and a control unit is configured to rotate the orientation of the display on the screen consistent with the functional fixed position of the first and second body elements relative to one another in a portrait or landscape operative position.

The invention claimed is:

1. Multi-position device, comprising:

first and second body elements arranged in an overlapping alignment and configured for sliding engagement and constrained for non-rotational movement with respect to one another along a common plane in an X-coordinate direction, a Y-coordinate direction and an XY coordinate direction along a triangular path defined by any one of a sequence of movements in coordinate directions (+X,+Y,−X−Y), or (+X,−Y,−X+Y), or (−X,+Y,+X−Y), or (−X,−Y,+X+Y), or (+Y,+X,−X−Y), or (+Y,−X,+X−Y), or (−Y,+X,−X+Y), or (−Y,−X,+X+Y) for positioning said first and second body elements in multiple different fixed positions relative to one another for accessing one or more different portions of an outward facing surface of one of said first and second body elements covered by the other of said first and second body elements when in said overlapping alignment.

2. The multi-position device as defined in claim 1 wherein said first body element is configured as the covering body element and said second body element is configured as the covered body element.

3. The multi-position device as defined in claim 2 further comprising one or more user interfaces carried on said outward facing surface of said second body element and configured to reveal said one or more user interfaces when said first body element is operatively positioned in an X-coordinate direction from said at rest operative position.

4. The multi-position device as defined in claim 2 further comprising one or more user interfaces carried on said outward facing surface of said second body element and configured to reveal said one or more user interfaces when said first body element is operatively positioned in a Y-coordinate direction from said at rest operative position.

5. The multi-position device as defined in claim 2 further comprising one or more user interfaces carried on said outward facing surface of said second body element and configured to reveal said one or more user interfaces when said first body element is operatively positioned in an XY-coordinate direction from said at rest operative position.

6. The multi-position device as defined in claim 2 configured with a display screen constructed in at least one of said first and second body elements.

7. The multi-position device as defined in claim 6 further comprising a control unit configured to rotate the orientation of the display on said screen consistent with the functional fixed position of said first and second body elements relative to one another in a portrait or landscape operative position.

8. The multi-position device as defined in claim 1 further comprising at least one user interface carried on said outward facing surface of said second body element.

9. The multi-position device as defined in claim 8 further comprising said user interface configured as a function keyboard, game controller, joystick, communication keypad, volume control, channel selector, TV-control, radio control, music player control, camera function control to carryout the associated corresponding intended function of the device.

10. The multi-position device as defined in claim 1 further comprising at least one user interface carried on an outward facing surface of said first body element.

11. The multi-position device as defined in claim 10 further comprising said user interface configured as a function keyboard, game controller, joystick, communication keypad, volume control, channel selector, TV-control, radio control, music player control, camera function control to carryout the associated corresponding intended function of the device.

12. The multi-position device as defined in claim 1 further comprising said overlapping alignment defining an at rest operative position.

13. The multi-position device as defined in claim 1 further comprising said first body element configured for movement from said overlapping alignment with said second body element along a rectilinear line back to said overlapping alignment with said second body element in a direction defined by any one of a sequence of coordinate movements (+X,−X), or (−X,+X), or (+Y,−Y), or (−Y,+Y).

14. The multi-position device as defined in claim 1 further comprising said first body element configured for movement from said overlapping alignment with said second body element along an L-shaped path back to said overlapping alignment with said second body element in a direction defined by any one of a sequence of coordinate movements (+X,+Y,−Y,−X), or (+X,−Y,+Y,−X), or (−X,+Y,−Y,+X), or (−X,−Y,+Y,+X), or (+Y,+X,−X,−Y), or (+Y,−X,+X,−Y), or (−Y,+X,−X,+Y), or (−Y,−X,+X,+Y).

15. The multi-position device as defined in claim 1 further comprising said first body element configured for movement from said overlapping alignment with said second body element along a triangular path back to said overlapping alignment with said second body element in a direction defined by any one of a sequence of coordinate movements (+X,+Y,−X−Y), or (+X,−Y,−X+Y), or (−X,+Y,+X−Y), or (−X,−Y,+X+Y), or (+Y,+X,−X−Y), or (+Y,−X,+X−Y), or (−Y,+X,−X+Y), or (−Y,−X,+X+Y).

16. The multi-position device as defined in claim 1 further configured as a mobile communication device.

17. Computer program comprising a set of instructions carried on a computer readable storage medium and executable by a processor in a multi-position device for automatically changing, if required, the orientation of information shown on a display of the multi-position device when the multi-position device is in a functional fixed position in a portrait or landscape operative position, further comprising:

rotating the orientation of the display on said screen consistent with the functional fixed position of said first and second body elements relative to one another in a portrait or landscape operative position wherein the first and second body elements overlap one another and are constrained for non-rotational movement with respect to one another in a common plane in an X-coordinate direction, a Y-coordinate direction and an XY coordinate direction along a triangular path defined by any one of a sequence of movements in coordinate directions (+X,+Y,−X−Y), or (+X,−Y,−X+Y), or (−X,+Y,+X−Y), or (−X,−Y,+X+Y), or (+Y,+X,−X−Y), or (+Y,−X,+X−Y), or Y,+X,−X+Y), or (−Y,−X,+X+Y) for positioning said first and second body elements in multiple different fixed positions relative to one another for accessing one or more different portions of an outward facing surface of one of said first and second body elements covered by the other of said first and second body elements when in said overlapping alignment.

* * * * *

UNITED STATES PATENT AND TRADEMARK OFFICE
CERTIFICATE OF CORRECTION

PATENT NO. : 7,720,446 B2
APPLICATION NO. : 11/436044
DATED : May 18, 2010
INVENTOR(S) : Anssi Vanska et al.

It is certified that error appears in the above-identified patent and that said Letters Patent is hereby corrected as shown below:

In column 12, line 58 (claim 17, line 20), insert -- (- -- after "or". (1st occurrence)

Signed and Sealed this

Thirty-first Day of August, 2010

David J. Kappos
*Director of the United States Patent and Trademark Office*